(12) United States Patent
S

(10) Patent No.: US 11,995,481 B2
(45) Date of Patent: May 28, 2024

(54) EFFICIENT CONNECTION POOLING

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/892,559

(22) Filed: Aug. 22, 2022

(65) Prior Publication Data
US 2024/0061726 A1 Feb. 22, 2024

(51) Int. Cl.
G06F 3/00 (2006.01)
G06F 9/54 (2006.01)

(52) U.S. Cl.
CPC .................. G06F 9/54 (2013.01)

(58) Field of Classification Search
CPC .................... G06F 9/54
USPC ...................... 719/310
See application file for complete search history.

(56) References Cited

U.S. PATENT DOCUMENTS

| | | | | | |
|---|---|---|---|---|---|
| 6,084,957 | A * | 7/2000 | Jyvala | ............ | H04M 3/48 379/265.11 |
| 6,105,067 | A * | 8/2000 | Batra | ............ | H04L 67/14 709/227 |
| 6,810,429 | B1 * | 10/2004 | Walsh | ............ | G06F 16/258 709/246 |
| 7,058,717 | B2 * | 6/2006 | Chao | ............ | H04L 67/1017 718/105 |
| 7,406,523 | B1 * | 7/2008 | Kruy | ............ | H04L 67/14 709/227 |
| 7,664,125 | B1 * | 2/2010 | Bauer | ............ | H04L 41/0813 370/408 |
| 7,813,914 | B1 * | 10/2010 | Allen | ............ | G06F 30/34 716/124 |
| 8,145,759 | B2 | 3/2012 | Bhogi et al. | | |
| 8,484,242 | B1 | 7/2013 | Singh et al. | | |
| 8,484,616 | B1 * | 7/2013 | McCann | ............ | G06F 8/20 717/106 |
| 8,635,265 | B2 * | 1/2014 | Reeves | ............ | H04L 67/1034 709/203 |
| 8,713,186 | B2 | 4/2014 | Chidambaran et al. | | |
| 8,763,091 | B1 * | 6/2014 | Singh | ............ | H04L 63/083 726/4 |
| 9,781,122 | B1 * | 10/2017 | Wilson | ............ | H04L 63/08 |
| 11,343,329 | B1 * | 5/2022 | Martinez Morais | .... | H04L 67/01 |

(Continued)

FOREIGN PATENT DOCUMENTS

WO WO-2004059906 A1 7/2004

OTHER PUBLICATIONS

David, Implementation Techniques for Main Memory Database Systems. (Year: 1984).*

(Continued)

Primary Examiner — Lechi Truong
(74) Attorney, Agent, or Firm — SCHWEGMAN LUNDBERG & WOESSNER, P.A.

(57) ABSTRACT

In order to address the technical problems encountered with tenant-specific connection pools and global connection pools, in an example embodiment, an efficient connection pool is provided, which restricts the total number of connections per application runtime instance (as with the global connection pool) but at the same time groups and maintains the connections at the tenant level, using tenant-specific sub-pools.

17 Claims, 5 Drawing Sheets

(56) References Cited

U.S. PATENT DOCUMENTS

| | | | | |
|---|---|---|---|---|
| 2004/0088413 | A1* | 5/2004 | Bhogi | G06F 9/5061 709/226 |
| 2005/0021688 | A1* | 1/2005 | Felts | H04L 41/0843 709/223 |
| 2005/0172029 | A1* | 8/2005 | Burke | H04L 67/141 709/227 |
| 2006/0095572 | A1* | 5/2006 | Burke | H04L 67/14 709/227 |
| 2007/0043840 | A1* | 2/2007 | Buesgen | H04L 45/46 709/223 |
| 2007/0136311 | A1* | 6/2007 | Kasten | H04L 67/14 |
| 2008/0080413 | A1* | 4/2008 | Cole | H04W 8/24 370/254 |
| 2008/0081580 | A1* | 4/2008 | Cole | H04W 24/04 455/187.1 |
| 2008/0228923 | A1* | 9/2008 | Chidambaran | H04L 67/56 709/227 |
| 2009/0265766 | A1* | 10/2009 | Mansell | H04L 67/63 726/4 |
| 2012/0124217 | A1* | 5/2012 | Bartley | H04L 12/2863 709/227 |
| 2013/0144946 | A1* | 6/2013 | Subramanian | H04L 63/10 709/204 |
| 2013/0268807 | A1* | 10/2013 | Spencer | G06F 11/1415 714/18 |
| 2018/0150337 | A1* | 5/2018 | Dolgov | G06F 16/283 |
| 2019/0115998 | A1* | 4/2019 | Kujawski | H04L 1/0018 |
| 2020/0236139 | A1* | 7/2020 | Arunachalam | H04L 63/205 |
| 2020/0264932 | A1* | 8/2020 | Maldini | H04L 67/55 |
| 2022/0156286 | A1* | 5/2022 | Obembe | H04L 67/568 |
| 2023/0075236 | A1* | 3/2023 | Viet | H04L 67/01 |
| 2023/0401129 | A1* | 12/2023 | Chilamakuri | G06F 11/0709 |

OTHER PUBLICATIONS

Ying Hua Zhou, DB2MMT: a massive multi-tenant database platform for cloud computing. (Year: 2011).*

Timothy Wood, CloudNet: Dynamic Pooling of Cloud Resources by Live WAN Migration of Virtual Machines.2011 (Year: 2011).*

Aboagye, M., "Improve database performance with connection pooling", [Online]. Retrieved from the Internet: <https://stackoverflow.blog/2020/10/14/improve-database-performance-with-connection-pooling/>, (2020), 10 pgs.

Atlassian, "Confluence slows and times out during periods of high load due to database connection pool", [Online]. Retrieved from the Internet: https://confluence.atlassian.com/confkb/confluence-slows-and-times-out-during-periods-of-high-load-due-to-database-connection-pool-146407630.html, (2022), 4 pgs.

Heroku, Dev Center, "Concurrency and Database Connections in Ruby with ActiveRecord", [Online]. Retrieved from the Internet: <https://devcenter.heroku.com/articles/concurrency-and-database-connections>, (2021), 6 pgs.

Oracle, "1 Oracle Database 12c Release 2 (12.2) New Features", [Online]. Retrieved from the Internet: https://docs.oracle.com/en/database/oracle/oracle-database/12.2/newft/new-features.html#GUID-97DA180D-F466-4893-9A25-9A90649E58BB, 105 pgs.

Oracle, "Configuring and Administering WebLogic JDBC", [Online]. Retrieved from the Internet: https://docs.oracle.com/cd/E13222_01/wls/docs70/jdbc/programming.html, 12 pgs.

* cited by examiner

EFFICIENT CONNECTION POOLING

TECHNICAL FIELD

This document generally relates to connections between applications in a cloud environment. More specifically, this document relates to efficient connection pooling.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany.

In a cloud environment, microservices often receive requests from callers. Callers may be users or may be other applications. In the case of other applications, these are either calling via commands from an end user, or programmatically accessing microservice interfaces, such as application program interfaces (APIs) of the microservices. Each microservice may then potentially connect in the cloud ton instance of a database.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
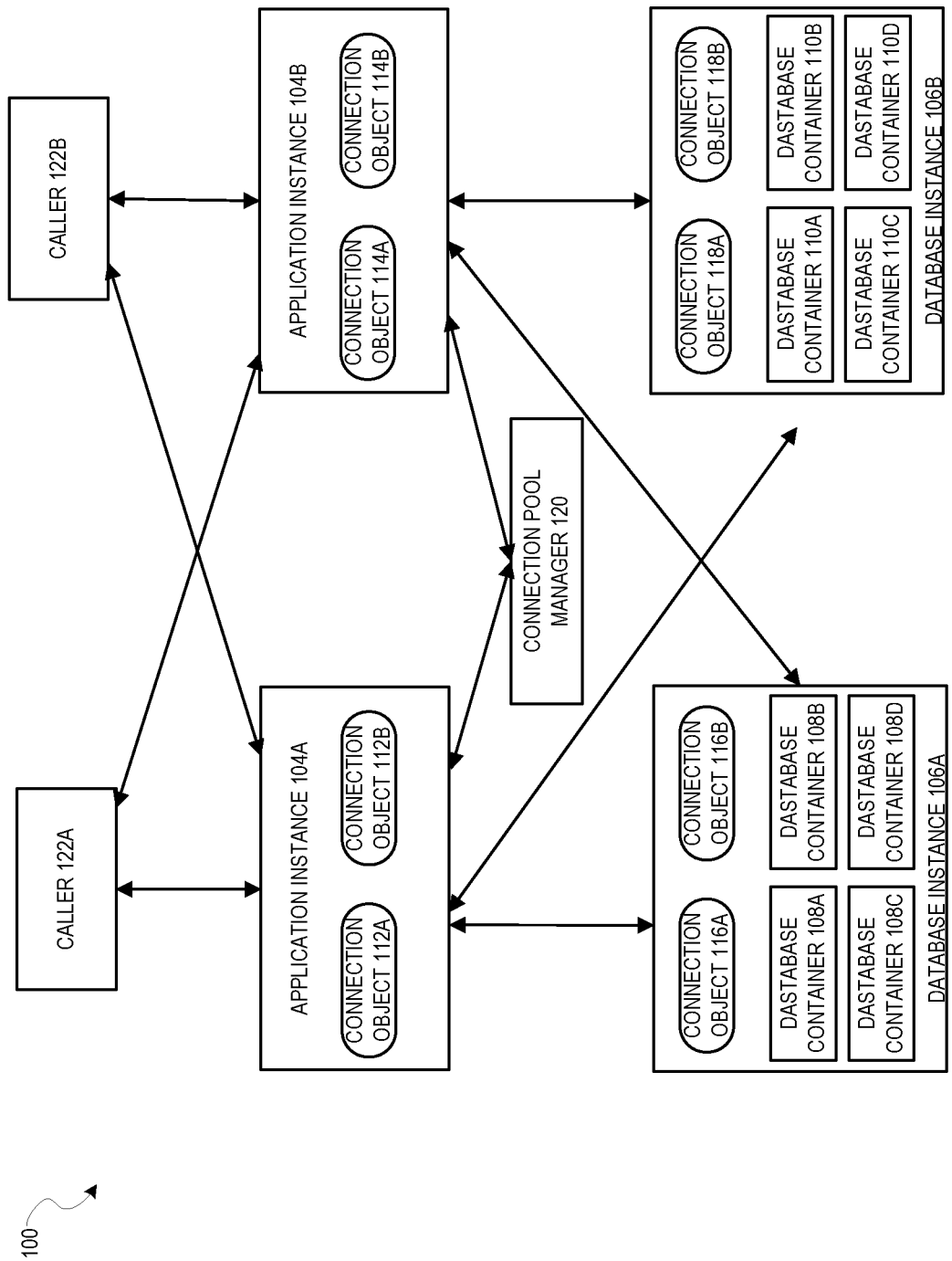
FIG. 1 is a block diagram illustrating a system, for connection pooling, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In cloud-based microservices environments, it is common to utilize a container-based infrastructure for microservice delivery and lifecycle.

Cloud Foundry™ is an open source, multi-cloud application platform as a service that allows for continuous delivery as it supports a full application development lifecycle, from initial deployment through testing stages to deployment. Cloud Foundry™ utilizes a container-based architecture that runs application in any programming language over a variety of cloud service providers.

In such a container-based infrastructure, the database instances utilized by the microservices may each contain a plurality of containers. More particularly, one example of a database used with cloud-based microservices is an in-memory database. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany. Thus, in embodiments where the HANA® database is used with the microservices, each HANA® instance may contain a plurality of different containers, called HANA® Deployment Infrastructure (HDI) containers. More particularly, each HDI container comprises a design-time container and a corresponding runtime container. The design-time container is an isolated environment for design-time files, while the runtime container stores the deployed objects built according to the specification stored in the corresponding design-time artifacts. The design-time container does not provide direct access to the database storage, but instead contains metadata that can only be accessed via an HDI API.

The result of a call from a caller to a microservice is that a database operation may be triggered to one of the HDI containers in a corresponding database instance. Each HDI container, however, needs a separate connection, as the authentication credentials for each HDI container is different. This is because in a multi-tenant architecture, the HDI contains need to separate data between different tenants.

In order to maintain a connection to an HDI container inside a database application runtime, a connection object needs to be maintained for the HDI connection. This connection object occupies a fixed size in memory. It should be noted that while the present disclosure specifically describes HANA® and HDI containers, the same technical issues and technical solutions can apply to any multi-tenant database that uses a separate authentication credential for each tenant. It may also apply to multiple individual databases (usually in size required for a single tenant) to manage multi-tenancy in a cloud application that uses separate authentication and connection for each database.

Often the number of instances of the microservice may also need to be increased in order to accommodate the incoming load from callers. One way of handling connections between microservice instances and database instances is to maintain a connection pool. In one possible scenario, a tenant specific connection pool is maintained, where each tenant is assigned their own pool. To avoid creating and deleting connections on every call to an HDI container, the connection is kept open in the pool as long as an idle connection pool size has not been exceeded. It is also possible for each tenant specific connection pool to have a maximum size (i.e., maximum number of available connections). Similarly there are various parameters possible that defines how a connection pool & connections inside the pool behaves. Like how many connections are kept idle on a minimum, maximum connections possible in a pool, when an idle connection is closed, maximum lifetime of a connection, keep alive time of a connection, etc., Another possibility is to use a global connection pool, which defines a maximum number of connections per application instance. Here, the pool is checked if the currently used connections are less than the maximum number of connections, and then a new connection is created when access is needed to the database instance. If a connection is not available (i.e., the maximum number of connections has already been reached, an unused connection is used (if possible) and a new connection is created. If there are no unused connections, then the new connection must wait until one becomes unused or disconnects.

Both types of connection pools encounter technical problems, however. With tenant-specific connection pools, the problem is the number of connections in the application runtime can drastically increase, which also then drastically increases the number of connection objects needed, which then can increase past the maximum memory size allocated to the application runtime. It also then increases the total number of database connections within the database instance as well.

With global connection pools, the problem is that every time the connection needs to be taken, additional time is needed due to the authentically process. This increases the overall response time to the caller.

In order to address the technical problems encountered with tenant-specific connection pools and global connection pools, in an example embodiment an efficient connection pool is provided, which restricts the total number of connections per application runtime instance (as with the global connection pool) but at the same time groups and maintains the connections at the tenant level, using tenant-specific sub-pools.

More particularly, a global connection pool of size X is established. Then, within that global connection pool, each tenant is assigned a sub-pool (whose size can vary depending on the tenant). The sub-pools' connection sizes are also then considered more variable than the size X of the global connection pool, as will be described in more detail below. More specifically, available connections can be transferred from one tenant sub-pool to another tenant sub-pool. Furthermore, even connections that are not technically "available," meaning that they are not disconnected, can be transferred from one tenant sub-pool to another tenant sub-pool if they are considered "unused". In some example embodiments, usage of the connections is tracked, not only to determine if connections are unused, but also to determine the level of non-use (e.g., how often they have been used during some time period). This allows the system to disconnect the "least used" connection from one tenant sub-pool and transfer it to another. Furthermore, if there is a tie for the "least used connection", the system can determine how often the subpools for those tied connections are used within the fixed time period, and then disconnect the connection from the sub-pool that is least used.

By using this technique, authentication is only required when a new connection is required and it is not already in the sub-pool for the tenant. If there is already a connection available in the sub-pool for the tenant, then no new authentication is needed. This improves overall efficiency as the number of new authentications to the database will be greatly reduced. As the peak time of different tenants are often different (e.g., some tenants are at peak load while others are not), this will also efficiently utilize the overall available resources and share them efficiently among the tenants.

FIG. 1 is a block diagram illustrating a system 100, for connection pooling, in accordance with an example embodiment. Here, a container-based cloud application deployment framework 102, such as Cloud Foundry™, contains a plurality of application runtimes 104A, 104B and a plurality of database instances 106A, 106B. Each application runtime 104A, 104B may be a separate instance of a microservice. Each database instance 106A, 106B contains a plurality of database containers 108A, 108B, 108C, 108D, 110A, 110B, 110C, 110D, respectively.

When connections are made between the application runtimes 104A, 104B and the database instances 106A, 106B, each connection is represented by a connection object 112A, 112B, 114A, 114B stored by the application runtimes 104A, 104B, respectively, as well as by corresponding connection objects 116A, 116B, 118A, 118B stored by the database instances 106A, 106B, respectively. It is the connection objects 112A, 112B, 114A, 114B stored by the application runtimes 104A, 104B, respectively, that cause memory problems, as each application runtime 104A, 104B is only assigned a finite amount of memory.

In an example embodiment, a connection pool manager 120 is used to manage connection pools and connection sub-pools. Implementation of the connection pool manager 120 may vary based on environment. In FIG. 1, the connection pool manager 120 is depicted as a component separate from the application runtimes 104A, 104B. When a caller 122A, 122B performs an operation in an application runtime 104A, 104B, then the application runtime 104A, 104B may need to request a new a new connection to a database instance 106A, 106B. Here, the application runtime 104A, 104B may request a connection in such a circumstance from the connection pool manager 120.

Upon receiving one of these requests, the connection pool manager 120 first determines the tenant for which this new connection would apply. This may be contained in the request itself, as a tenant identification in either metadata or the body of the request. The connection pool manager 120 then retrieves a sub-pool corresponding to the tenant for which this new connection would apply.

The connection pool manager 120 then determines if there are any available connections in the sub-pool. If so, then a connection from the sub-pool is assigned to the new connection. Notably, this connection then does not require that authentication be performed for the connection request, thereby saving the time that it would have taken to authenticate the tenant, which, as stated earlier, improves response time to the corresponding caller 122A, 122B.

If there are no connections available in the sub-pool, then the connection pool manager 120 determines whether the total number of currently assigned connections (globally across all tenants) meets or exceeds a global connection pool size. If not, then a new connection is created and assigned to the sub-pool.

If, on the other hand, the total number of currently assigned connections (globally across all tenants) meets or exceeds the global connection pool size, then the connection pool manager 120 determines whether there are any idle (i.e., unused) connections in any sub-pools. If not, then the connection pool manager 120 keeps the connection request in a cache until at least one connection in any sub-pool becomes idle.

When the connection pool manager 120 determines that there is exactly one idle connection in all the sub-pools, then that connection is disconnected and assigned to the current sub-pool, at which point it can then be assigned to the request. If there is more than one idle connection in all the sub-pools, then a determination is made as to how often each of those idle connections was used during some preset time period. The idle connection that was least often used during that preset time period can then be the one that is disconnected and assigned to the current sub-pool, at which point it can then be assigned to the request. In the case where there is a tie (among two or more connections) for the connection that was least often used during that preset time period, the connection pool manager 120 can select the connection that is from a sub-pool that itself is the least often used during the preset time period in comparison to the other sub-pools. If there is still a tie (e.g., the tied connections are from two sub-pools who have both been used the same amount in during the preset time period), then some other mechanism for breaking the tie can be used, such as just selecting one of the connections randomly.

The result is that connections that are able to be assigned from within the sub-pool of the tenant corresponding to the new connection request are assigned from that sub-pool, eliminating the need for new authentication operations in those cases, and if that is not possible, then connections are taken from other tenants' sub-pools, specifically the connections that are least likely to be re-used.

In order to perform all of the above operations, the connection pool manager 120 may maintain its own data structures that track the global connection pool and all the tenant-specific sub-pools. In an example embodiment, these data structures may be in the form of tables, such as a separate table for each tenant-specific sub-pool and a global connection pool table tracking the overall number of connections assigned.

Figure 2:
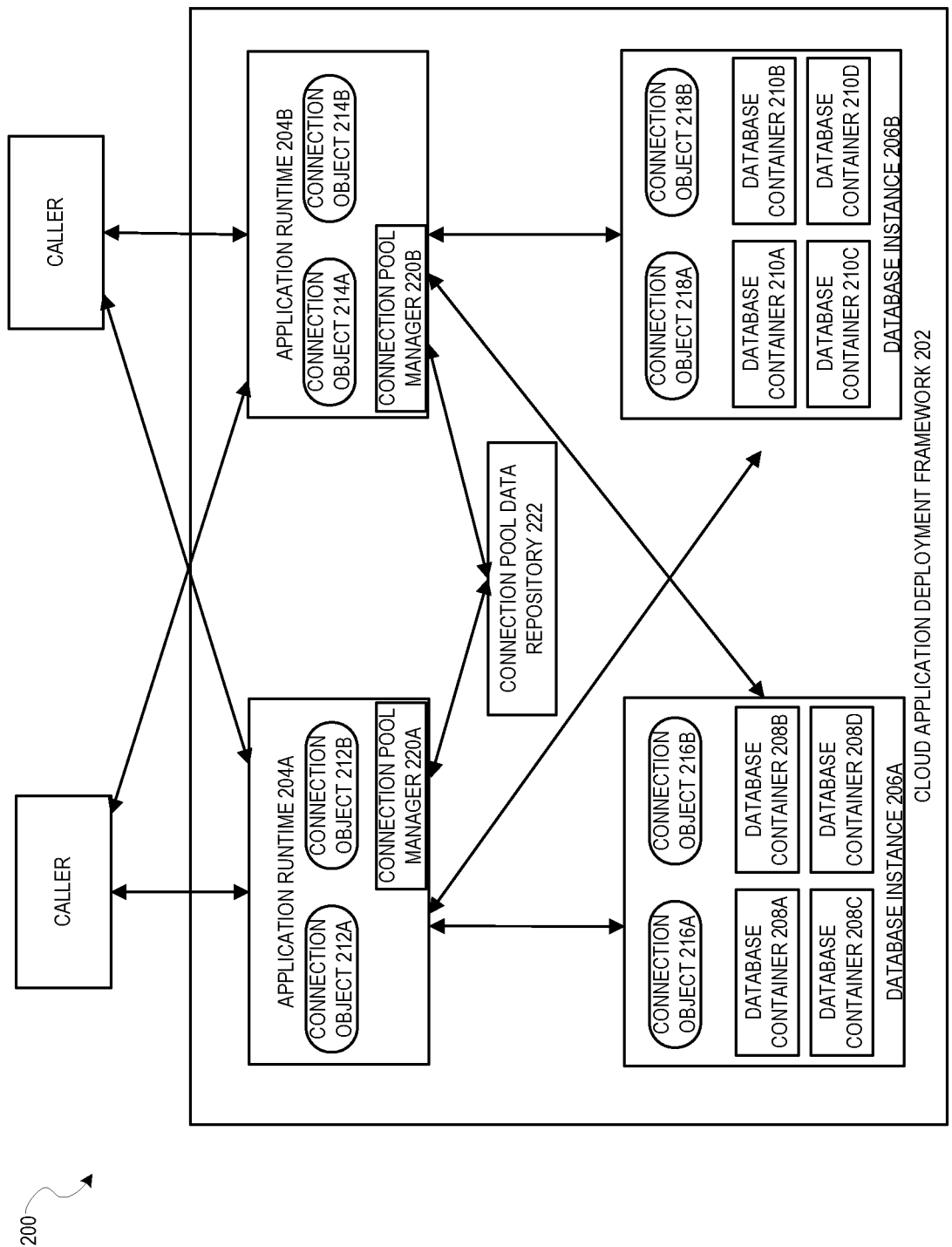
FIG. 2 is a block diagram illustrating a system, for connection pooling, in accordance with another example embodiment.

FIG. 2 is a block diagram illustrating a system 200, for connection pooling, in accordance with another example embodiment. Here, as in FIG. 1, a container-based cloud application deployment framework 202, such as Cloud Foundry™, contains a plurality of application runtimes 204A, 204B and a plurality of database instances 206A, 206B. Each application runtime 204A, 204B may be a separate instance of a microservice. Each database instance 206A, 206B contains a plurality of database containers 208A, 208B, 208C, 208D, 210A, 210B, 210C, 210D, respectively.

Also as in FIG. 1, when connections are made between the application runtimes 204A, 204B and the database instances 206A, 206B, each connection is represented by a connection object 212A, 212B, 214A, 214B stored by the application runtimes 204A, 204B, respectively, as well as by corresponding connection objects 216A, 216B, 218A, 218B stored by the database instances 206A, 206B, respectively. It is the connection objects 212A, 212B, 214A, 214B stored by the application runtimes 204A, 204B, respectively, that cause memory problems, as each application runtime 204A, 204B is only assigned a finite amount of memory.

Here, rather than having a centralized connection pool manager, however, each application runtime 204A, 204B includes its own connection pool manager 220A, 220B. These local connection pool managers 220A, 220B may be identical to each other, and essentially operate the same functionality as the connection pool manager 120 of FIG. 1, with the exception that data relied upon by the local connection pool managers 220A, 220B to manage the global connection pool and the tenant-specific sub-pools may itself be stored in a centralized connection pool data repository 222 that is accessed when needed by the local connection pool managers 220A, 220B.

Figure 3:
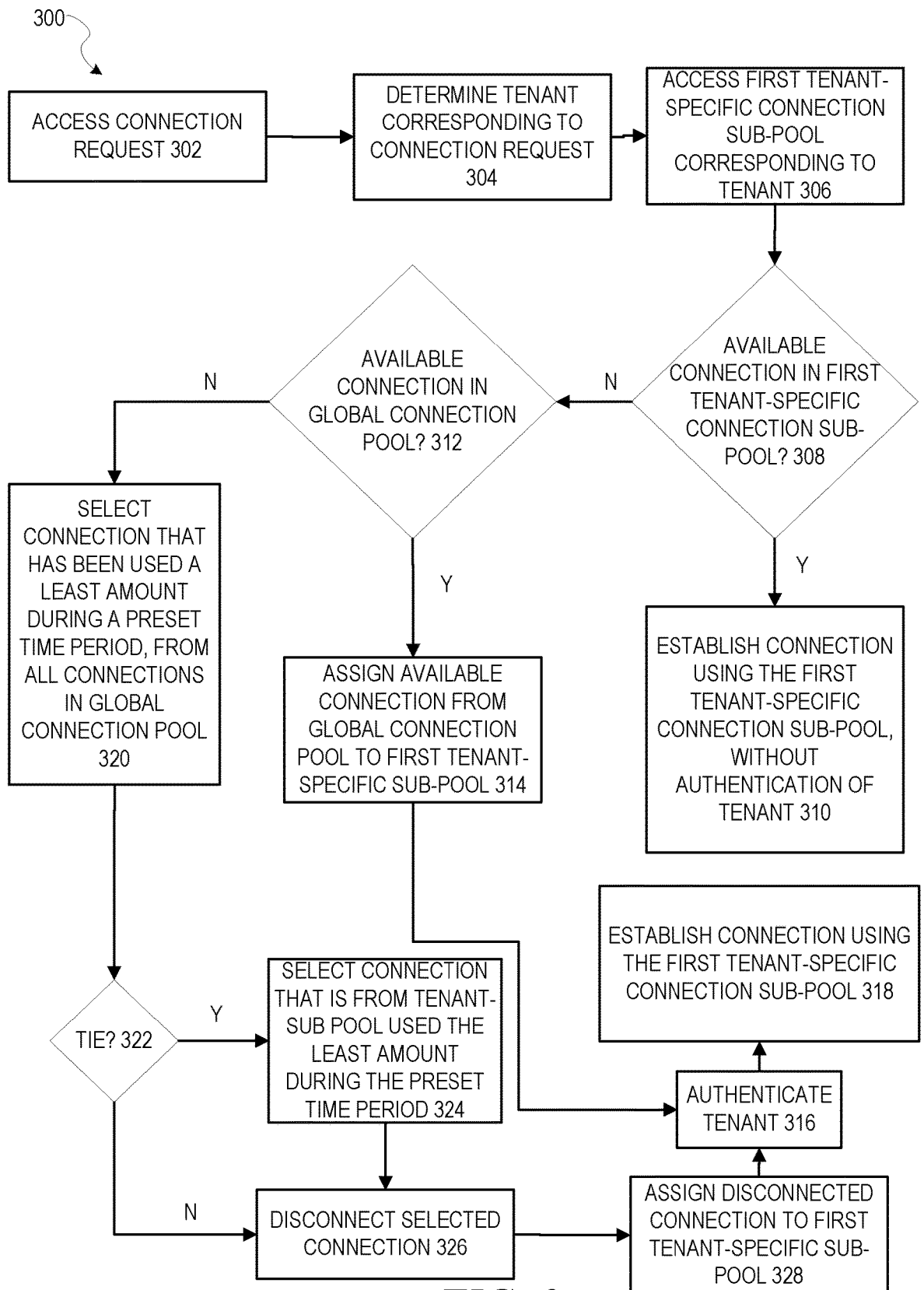
FIG. 3 is a flow diagram illustrating a method of managing connection pools in accordance with an example embodiment.

FIG. 3 is a flow diagram illustrating a method 300 of managing connection pools in accordance with an example embodiment. The method 300 may be performed by a connection pool manager, separate from application instances, or may be performed within the application instances themselves. At operation 302, a connection request is accessed. This connection request may be accessed when it is received from an application instance. The connection request may specify a tenant identification for the request. At operation 304, a tenant corresponding to the connection request is determined. This may be determined by looking at the tenant identification in the request, if it is available. If not, some other mechanism for identifying the tenant corresponding to the request may be utilized.

At operation 306, a first tenant-specific connection sub-pool corresponding to the tenant may be accessed. In cases where the method 300 is performed in the application instance itself, this may include querying one or more data structures in a central connection repository.

At operation 308, it is determined if there are any connections available in the first tenant-specific connection sub-pool. If so, then at operation 310 the connection may be established using the first tenant-specific connection sub-pool, without authentication of the tenant. If at operation 308 it was determined that there were no connections available in the first tenant-specific connection sub-pool, then at operation 312, it is determined whether there are any available connections in the global connection pool. If so, then at operation 314, an available connection from the global connection pool is assigned to the first tenant-specific sub-pool. Then, at operation 316, the tenant is authenticated. At operation 318, a connection is established using the first tenant-specific connection sub-pool.

If at operation 312, it was determined that there were no available connections in the global connection pool, then at operation 320, a connection that has been used a least amount during a preset time period, from all connections in the global connection pool, is selected. If at operation 322 it is determined there is a tie among more than one such least-amount using connections, then at operation 324, the connection that is from a tenant sub-pool that is used the least amount during the preset time period is selected.

Then, at operation 326, the selected connection is disconnected. At operation 328, the disconnected connection is assigned to the first tenant-specific sub-pool. The method then proceeds to operation 316 and 318, as described earlier.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
accessing a connection request, the connection request generated by an application instance to connect the application instance to a database instance;
determining a tenant corresponding to the connection request;
accessing a first tenant-specific connection sub-pool corresponding to the tenant corresponding to the connection request;
determining whether there are any available connections in the first tenant-specific connection sub-pool;
in response to a determination that there are no available connections in the first tenant-specific connection sub-pool, determining whether there are any available connections in a global connection pool;

in response to a determination that there are no available connections in the global connection pool:
    selecting a connection that has been used a least amount during a preset time period, from all the connections in the global connection pool;
    disconnecting the selected connection;
    assigning the disconnected connection to the first tenant-specific sub-pool; and
    establishing a connection between the application instance and the database instance using the first tenant-specific sub-pool.

Example 2. The system of Example 1, wherein the selecting further comprises:
    comparing a number of times each connection was used during the preset time period among all the connections in the global connection pool;
    determining whether there is a tie among two or more connections in the global connection pool for the least used connection during the preset time period; and
    in response to a determination that there is a tie among two or more connections in the global connection pool, selecting a connection from the two or more tied connections based on which connection is from a tenant-specific sub-pool that has been used the least during the preset time period.

Example 3. The system of Examples 1 or 2, wherein the establishing of a connection comprises performing authentication of the tenant corresponding to the connection request.

Example 4. The system of Example 3, wherein the operations further comprise:
    accessing a second connection request
    determining a second tenant corresponding to the second connection request;
    accessing a second tenant-specific connection sub-pool corresponding to the second tenant;
    determining whether there are any available connections in the second tenant-specific connection sub-pool; and
    in response to a determination that there are available connections in the second tenant-specific connection sub-pool, establishing a connection using the second tenant-specific sub-pool without performing authentication of the second tenant.

Example 5. The system of any of Examples 1-4, wherein the operations further comprise:
    accessing a third connection request;
    determining a third tenant corresponding to the third connection request;
    accessing a third tenant-specific connection sub-pool corresponding to the third tenant;
    determining whether there are any available connections in the third tenant-specific connection sub-pool;
    in response to a determination that there are no available connections in the third tenant-specific connection sub-pool, determining whether there are any available connections in the global connection pool;
    in response to a determination that there are available connections in the global connection pool:
        assigning an available connection from the global connection pool to the third tenant-specific connection sub-pool; and
        establishing a connection using the third tenant-specific sub-pool.

Example 6. The system of any of Examples 1-5, wherein the accessing the connection request comprises receiving the connection request from the application instance.

Example 7. The system of any of Examples 1-6, wherein the operations are performed by a component in a container-based infrastructure.

Example 8. A method comprising:
    accessing a connection request, the connection request generated by an application instance to connect the application instance to a database instance;
    determining a tenant corresponding to the connection request;
    accessing a first tenant-specific connection sub-pool corresponding to the tenant corresponding to the connection request;
    determining whether there are any available connections in the first tenant-specific connection sub-pool;
    in response to a determination that there are no available connections in the first tenant-specific connection sub-pool, determining whether there are any available connections in a global connection pool;
    in response to a determination that there are no available connections in the global connection pool:
        selecting a connection that has been used a least amount during a preset time period, from all the connections in the global connection pool;
        disconnecting the selected connection;
        assigning the disconnected connection to the first tenant-specific sub-pool; and
        establishing a connection between the application instance and the database instance using the first tenant-specific sub-pool.

Example 9. The method of Example 8, wherein the selecting further comprises:
    comparing a number of times each connection was used during the preset time period among all the connections in the global connection pool;
    determining whether there is a tie among two or more connections in the global connection pool for the least used connection during the preset time period; and
    in response to a determination that there is a tie among two or more connections in the global connection pool, selecting a connection from the two or more tied connections based on which connection is from a tenant-specific sub-pool that has been used the least during the preset time period.

Example 10. The method of any of Examples 8-9, wherein the establishing a connection comprises performing authentication of the tenant corresponding to the connection request.

Example 11. The method of Example 10, further comprising:
    accessing a second connection request
    determining a second tenant corresponding to the second connection request;
    accessing a second tenant-specific connection sub-pool corresponding to the second tenant;
    determining whether there are any available connections in the second tenant-specific connection sub-pool; and
    in response to a determination that there are available connections in the second tenant-specific connection sub-pool, establishing a connection using the second tenant-specific sub-pool without performing authentication of the second tenant.

Example 12. The method of any of Examples 8-11, further comprising:
    accessing a third connection request;
    determining a third tenant corresponding to the third connection request;

accessing a third tenant-specific connection sub-pool corresponding to the third tenant;
determining whether there are any available connections in the third tenant-specific connection sub-pool;
in response to a determination that there are no available connections in the third tenant-specific connection sub-pool, determining whether there are any available connections in the global connection pool;
in response to a determination that there are available connections in the global connection pool:
assigning an available connection from the global connection pool to the third tenant-specific connection sub-pool; and
establishing a connection using the third tenant-specific sub-pool.

Example 13. The method of any of Examples 8-12, wherein the accessing the connection request comprises receiving the connection request from the application instance.

Example 14. The method of any of Examples 8-13, wherein the method is performed by a component in a container-based infrastructure.

Example 15. A non-transitory machine-readable medium storing instructions which, when executed by one or more processors, cause the one or more processors to perform operations comprising:
accessing a connection request, the connection request generated by an application instance to connect the application instance to a database instance;
determining a tenant corresponding to the connection request;
accessing a first tenant-specific connection sub-pool corresponding to the tenant corresponding to the connection request;
determining whether there are any available connections in the first tenant-specific connection sub-pool;
in response to a determination that there are no available connections in the first tenant-specific connection sub-pool, determining whether there are any available connections in a global connection pool;
in response to a determination that there are no available connections in the global connection pool:
selecting a connection that has been used a least amount during a preset time period, from all the connections in the global connection pool;
disconnecting the selected connection;
assigning the disconnected connection to the first tenant-specific sub-pool; and
establishing a connection between the application instance and the database instance using the first tenant-specific sub-pool.

Example 16. The non-transitory machine-readable medium of Example 15, wherein the selecting further comprises:
comparing a number of times each connection was used during the preset time period among all the connections in the global connection pool;
determining whether there is a tie among two or more connections in the global connection pool for the least used connection during the preset time period; and
in response to a determination that there is a tie among two or more connections in the global connection pool, selecting a connection from the two or more tied connections based on which connection is from a tenant-specific sub-pool that has been used the least during the preset time period.

Example 17. The non-transitory machine-readable medium of Examples 15 or 16, wherein the establishing of a connection comprises performing authentication of the tenant corresponding to the connection request.

Example 18. The non-transitory machine-readable medium of Example 17, wherein the operations further comprise:
accessing a second connection request
determining a second tenant corresponding to the second connection request;
accessing a second tenant-specific connection sub-pool corresponding to the second tenant;
determining whether there are any available connections in the second tenant-specific connection sub-pool; and
in response to a determination that there are available connections in the second tenant-specific connection sub-pool, establishing a connection using the second tenant-specific sub-pool without performing authentication of the second tenant.

Example 19. The non-transitory machine-readable medium of any of Examples 15-18, wherein the operations further comprise:
accessing a third connection request;
determining a third tenant corresponding to the third connection request;
accessing a third tenant-specific connection sub-pool corresponding to the third tenant;
determining whether there are any available connections in the third tenant-specific connection sub-pool;
in response to a determination that there are no available connections in the third tenant-specific connection sub-pool, determining whether there are any available connections in the global connection pool;
in response to a determination that there are available connections in the global connection pool:
assigning an available connection from the global connection pool to the third tenant-specific connection sub-pool; and
establishing a connection using the third tenant-specific sub-pool.

Example 20. The non-transitory machine-readable medium of any of Examples 15-19, wherein the accessing the connection request comprises receiving the connection request from the application instance.

Figure 4:
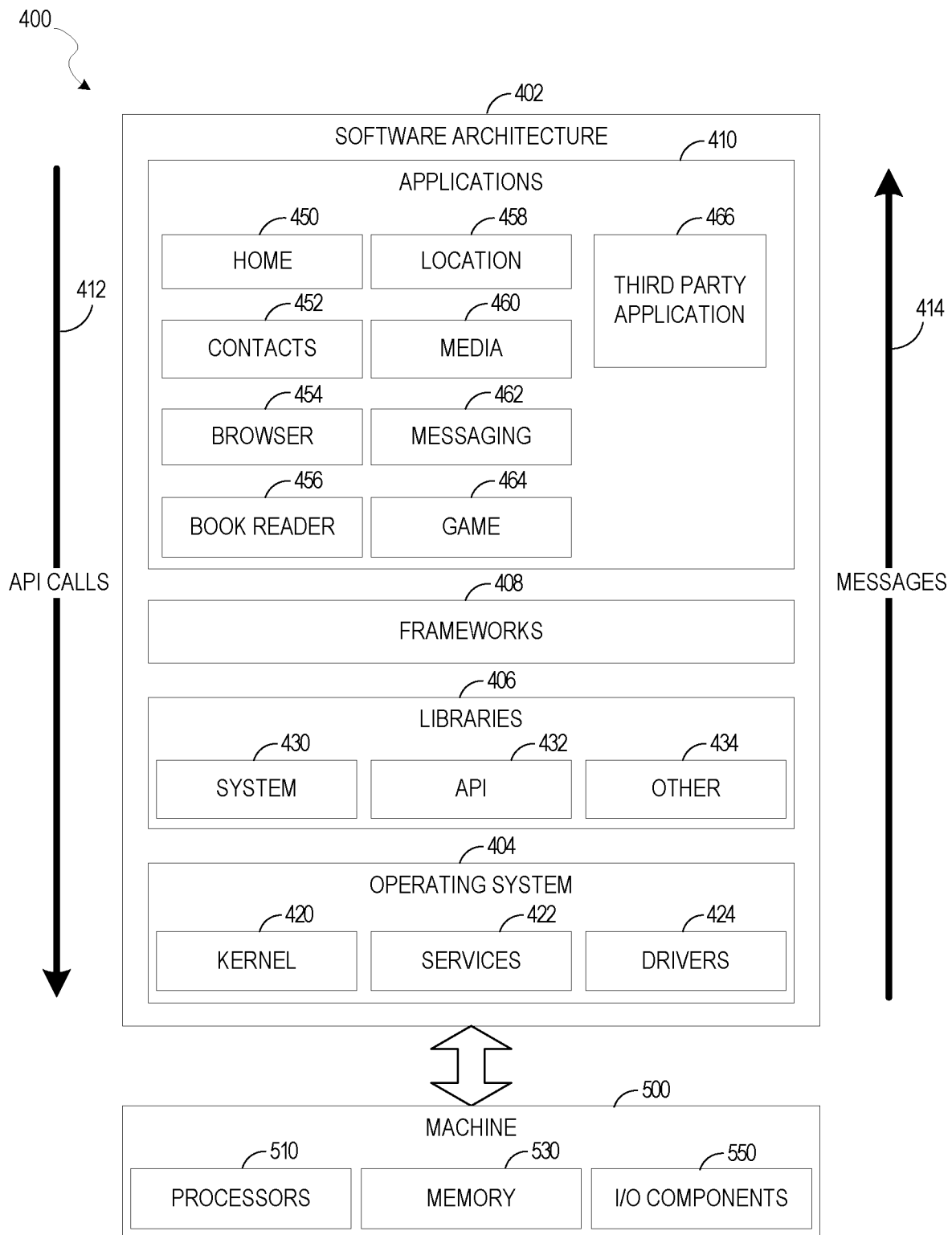
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
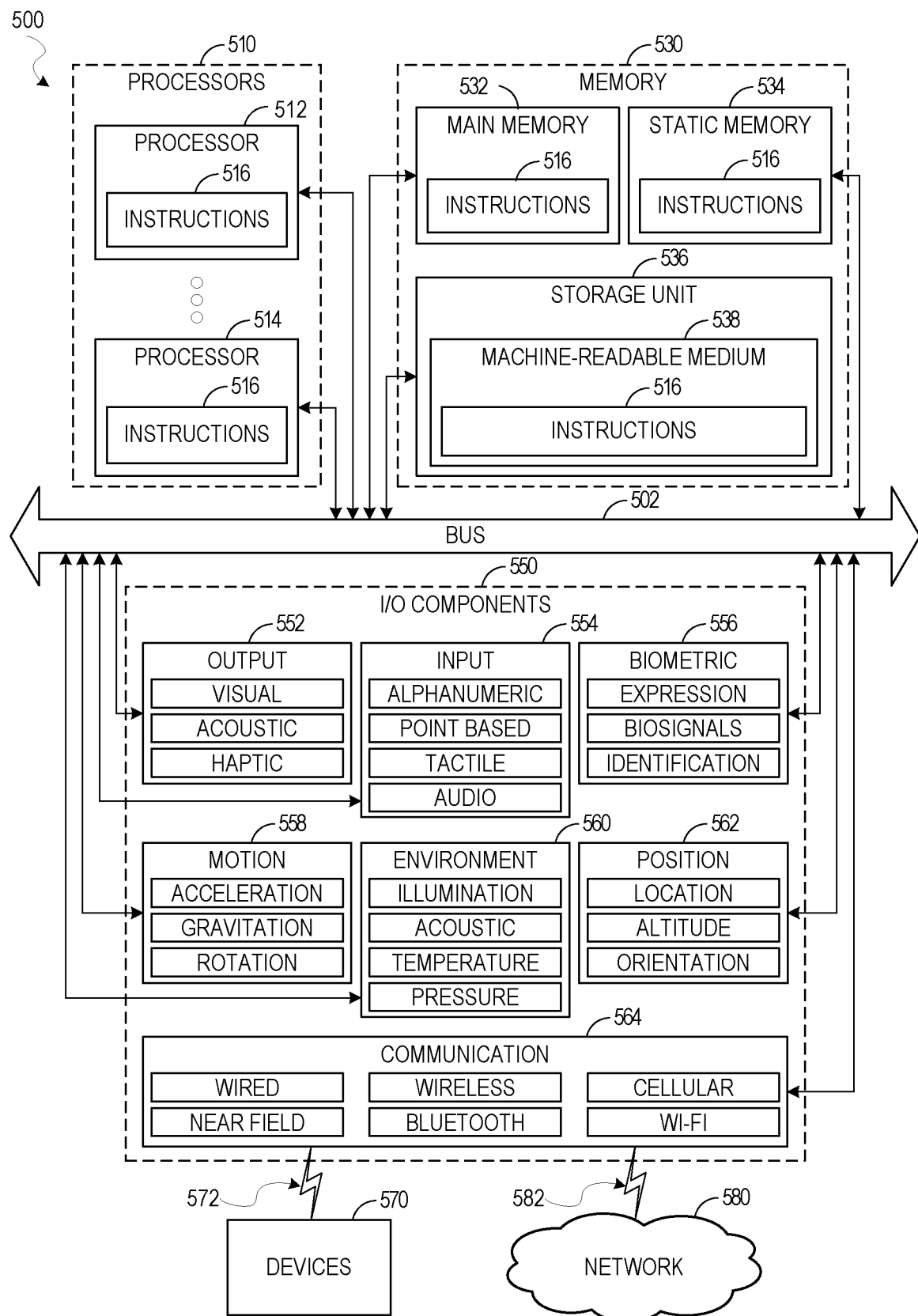
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code), for causing the machine 500 to perform any one or more of the methodologies discussed herein, may be executed. For example, the instructions 516 may cause the machine 500 to execute the methods of FIG. 4. Additionally, or alternatively, the instructions 516 may implement FIGS. 1-4 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising: at least one hardware processor; and a computer-readable medium storing instructions that, when executed by the at least one hardware processor, cause the at least one hardware processor to perform operations comprising: accessing a connection request, the connection request generated by an application instance to connect the application instance to a database instance; determining a tenant corresponding to the connection request, the tenant being a group of users with shared access to a portion of the database instance; accessing a first tenant-specific connection sub-pool corresponding to the tenant corresponding to the connection request; determining whether there are any available connections in the first tenant-specific connection sub-pool; in response to a determination that there are no available connections in the first tenant-specific connection sub-pool, determining whether there are any available connections in a global connection pool, wherein the first tenant-specific connection sub-pool is a subset of the global connection pool; and in response to a determination that there are no available connections in the global connection pool: selecting a connection that has been used a least amount during a preset time period, from all the connections in the global connection pool; disconnecting the selected connection; assigning the disconnected connection to the first tenant-specific sub-pool; and establishing a connection between the application instance and the database instance using the first tenant-specific sub-pool; wherein the establishing a connection comprises performing authentication of the tenant corresponding to the connection request.

2. The system of claim 1, wherein the selecting further comprises: comparing a number of times each connection was used during the preset time period among all the connections in the global connection pool; determining whether there is a tie among two or more connections in the global connection pool for the least used connection during the preset time period; and in response to a determination that there is a tie among two or more connections in the global connection pool, selecting a connection from the two or more tied connections based on which connection is from a tenant-specific sub-pool that has been used the least during the preset time period.

3. The system of claim 1, wherein the operations further comprise: accessing a second connection request; determining a second tenant corresponding to the second connection request; accessing a second tenant-specific connection sub-pool corresponding to the second tenant; determining whether there are any available connections in the second tenant-specific connection sub-pool; and in response to a determination that there are available connections in the second tenant-specific connection sub-pool, establishing a connection using the second tenant-specific sub-pool without performing authentication of the second tenant.

4. The system of claim 1, wherein the operations further comprise: accessing a third connection request; determining a third tenant corresponding to the third connection request; accessing a third tenant-specific connection sub-pool corresponding to the third tenant; determining whether there are any available connections in the third tenant-specific connection sub-pool; in response to a determination that there are no available connections in the third tenant-specific connection sub-pool, determining whether there are any available connections in the global connection pool; and in response to a determination that there are available connections in the global connection pool: assigning an available connection from the global connection pool to the third tenant-specific connection sub-pool; and establishing a connection using the third tenant-specific sub-pool.

5. The system of claim 1, wherein the accessing the connection request comprises receiving the connection request from the application instance.

6. The system of claim 1, wherein the operations are performed by a component in a container-based infrastructure.

7. A method comprising: accessing a connection request, the connection request generated by an application instance to connect the application instance to a database instance; determining a tenant corresponding to the connection request, the tenant being a group of users with shared access to a portion of the database instance; accessing a first tenant-specific connection sub-pool corresponding to the tenant corresponding to the connection request; determining whether there are any available connections in the first tenant-specific connection sub-pool; in response to a determination that there are no available connections in the first tenant-specific connection sub-pool, determining whether there are any available connections in a global connection pool, wherein the first tenant-specific connection sub-pool is a subset of the global connection pool; in response to a determination that there are no available connections in the global connection pool: selecting a connection that has been used a least amount during a preset time period, from all the connections in the global connection pool; disconnecting the selected connection; assigning the disconnected connection to the first tenant-specific sub-pool; and establishing a connection between the application instance and the database instance using the first tenant-specific sub-pool;

wherein the establishing a connection comprises performing authentication of the tenant corresponding to the connection request.

8. The method of claim 7, wherein the selecting further comprises: comparing a number of times each connection was used during the preset time period among all the connections in the global connection pool; determining whether there is a tie among two or more connections in the global connection pool for the least used connection during the preset time period; and in response to a determination that there is a tie among two or more connections in the global connection pool, selecting a connection from the two or more tied connections based on which connection is from a tenant-specific sub-pool that has been used the least during the preset time period.

9. The method of claim 1, further comprising: accessing a second connection request; determining a second tenant corresponding to the second connection request; accessing a second tenant-specific connection sub-pool corresponding to the second tenant; determining whether there are any available connections in the second tenant-specific connection sub-pool;

and in response to a determination that there are available connections in the second tenant-specific connection sub-pool, establishing a connection using the second tenant-specific sub-pool without performing authentication of the second tenant.

10. The method of claim 7, further comprising: accessing a third connection request; determining a third tenant corresponding to the third connection request; accessing a third tenant-specific connection sub-pool corresponding to the third tenant; determining whether there are any available connections in the third tenant-specific connection sub-pool; in response to a determination that there are no available connections in the third tenant-specific connection sub-pool, determining whether there are any available connections in the global connection pool; and in response to a determination that there are available connections in the global connection pool: assigning an available connection from the global connection pool to the third tenant-specific connection sub-pool; and establishing a connection using the third tenant-specific sub-pool.

11. The method of claim 7, wherein the accessing the connection request comprises receiving the connection request from the application instance.

12. The method of claim 7, wherein the method is performed by a component in a container-based infrastructure.

13. A non-transitory machine-readable medium storing instructions which, when executed by one or more processors, cause the one or more processors to perform operations comprising: accessing a connection request, the connection request generated by an application instance to connect the application instance to a database instance; determining a tenant corresponding to the connection request, the tenant being a group of users with shared access to a portion of the database instance; accessing a first tenant-specific connection sub-pool corresponding to the tenant corresponding to the connection request; determining whether there arc any available connections in the first tenant-specific connection sub-pool; in response to a determination that there are no available connections in the first tenant-specific connection sub-pool, determining whether there are any available connections in a global connection pool, wherein the first tenant-specific connection sub-pool is a subset of the global connection pool; in response to a determination that there are no available connections in the global connection pool: selecting a connection that has been used a least amount during a preset time period, from all the connections in the global connection pool; disconnecting the selected connection; assigning the disconnected connection to the first tenant-specific sub-pool; and establishing a connection between the application instance and the database instance using the first tenant-specific sub-pool;

wherein the establishing a connection comprises performing authentication of the tenant corresponding to the connection request.

14. The non-transitory machine-readable medium of claim 13, wherein the selecting further comprises: comparing a number of times each connection was used during the preset time period among all the connections in the global connection pool; determining whether there is a tie among two or more connections in the global connection pool for the least used connection during the preset time period; and in response to a determination that there is a tie among two or more connections in the global connection pool, selecting a connection from the two or more tied connections based on which connection is from a tenant-specific sub-pool that has been used the least during the preset time period.

15. The non-transitory machine-readable medium of claim 13, wherein the operations further comprise: accessing a second connection request; determining a second tenant corresponding to the second connection request; accessing a second tenant-specific connection sub-pool corresponding to the second tenant; determining whether there are any available connections in the second tenant-specific connection sub-pool; and in response to a determination that there are available connections in the second tenant-specific connection sub-pool, establishing a connection using the second tenant-specific sub-pool without performing authentication of the second tenant.

16. The non-transitory machine-readable medium of claim 13, wherein the operations further comprise: accessing a third connection request; determining a third tenant corresponding to the third connection request; accessing a third tenant-specific connection sub-pool corresponding to the third tenant; determining whether there are any available connections in the third tenant-specific connection sub-pool; in response to a determination that there are no available connections in the third tenant-specific connection sub-pool, determining whether there are any available connections in the global connection pool; and in response to a determination that there are available connections in the global connection pool: assigning an available connection from the global connection pool to the third tenant-specific connection sub-pool; and establishing a connection using the third tenant-specific sub-pool.

17. The non-transitory machine-readable medium of claim 13, wherein the accessing the connection request comprises receiving the connection request from the application instance.

\* \* \* \* \*